United States Patent [19]

Romagnoli

[11] 4,150,751

[45] Apr. 24, 1979

[54] TABLET FEEDER FOR FILLING HONEYCOMB-LIKE CELLS OF A TAPE

[76] Inventor: Andrea Romagnoli, via Madonna dei Boschi, 18, S. Lazzaro Di Savena, Bologna, Italy

[21] Appl. No.: 843,093

[22] Filed: Oct. 17, 1977

[30] Foreign Application Priority Data

Oct. 20, 1976 [IT] Italy .................................. 3569 A/76

[51] Int. Cl.² .............................................. B07C 5/12
[52] U.S. Cl. .................................... 209/682; 198/757
[58] Field of Search .................... 209/82, 85, 97, 682; 198/757

[56] References Cited

U.S. PATENT DOCUMENTS

| 2,718,957 | 9/1955 | Spurlin | 198/757 |
| 3,216,431 | 11/1965 | White | 198/757 |
| 3,655,033 | 4/1972 | Lynch et al. | 198/757 |

FOREIGN PATENT DOCUMENTS

| 861321 | 1/1971 | Canada | 209/97 |

*Primary Examiner*—Allen N. Knowles
*Attorney, Agent, or Firm*—Guido Modiano; Albert Josif

[57] ABSTRACT

A tablet feeder for filling cells arranged in longitudinal rows in a belt moving forward continuously, comprising a tablet container having a vertical axis cylindrical wall and a slightly convex base, at least one bracket member extending along a cylindrical helix around the inner surface of the wall and resting at the bottom on said base; a vibrating means associated with the container and being effective to cause at least one such row of tablets to climb up along the bracket member, at least one tablet guiding tubular duct extending obliquely from the top end of the bracket member downwardly, and having an upper tablet inlet mouth in alignment with the bracket member to receive the tablets and a lower tablet outlet mouth substantially orthogonal with respect to the belt direction of advance. The lower mouth is aligned with the cells of a longitudinal row to be filled, each tablet being urged into a respective empty cell by the tablets following it.

7 Claims, 12 Drawing Figures

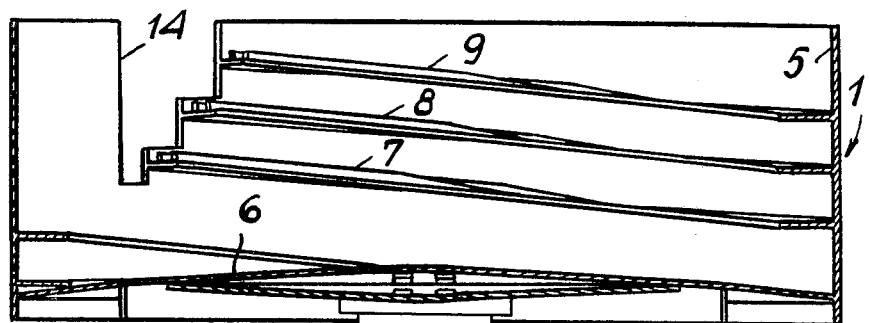
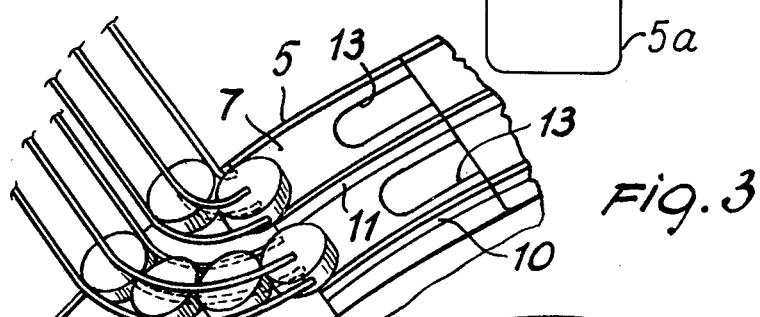
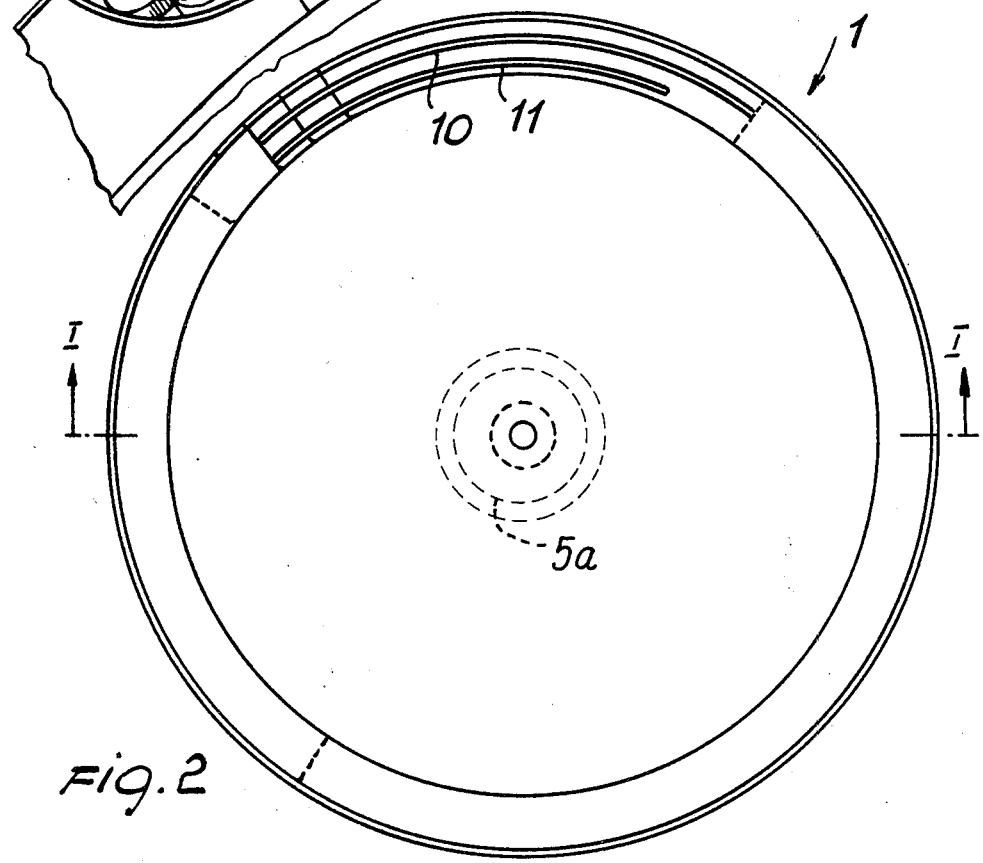

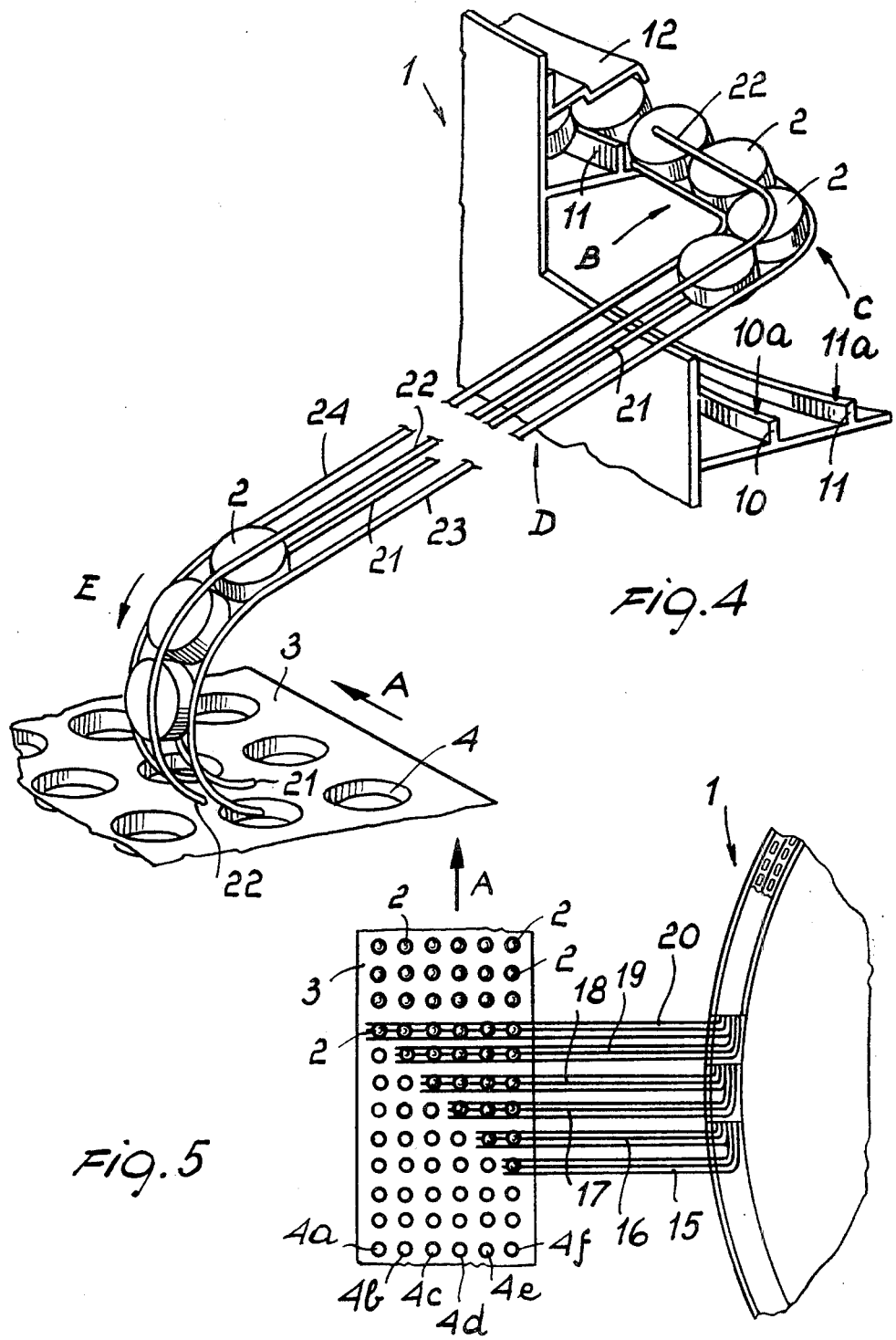

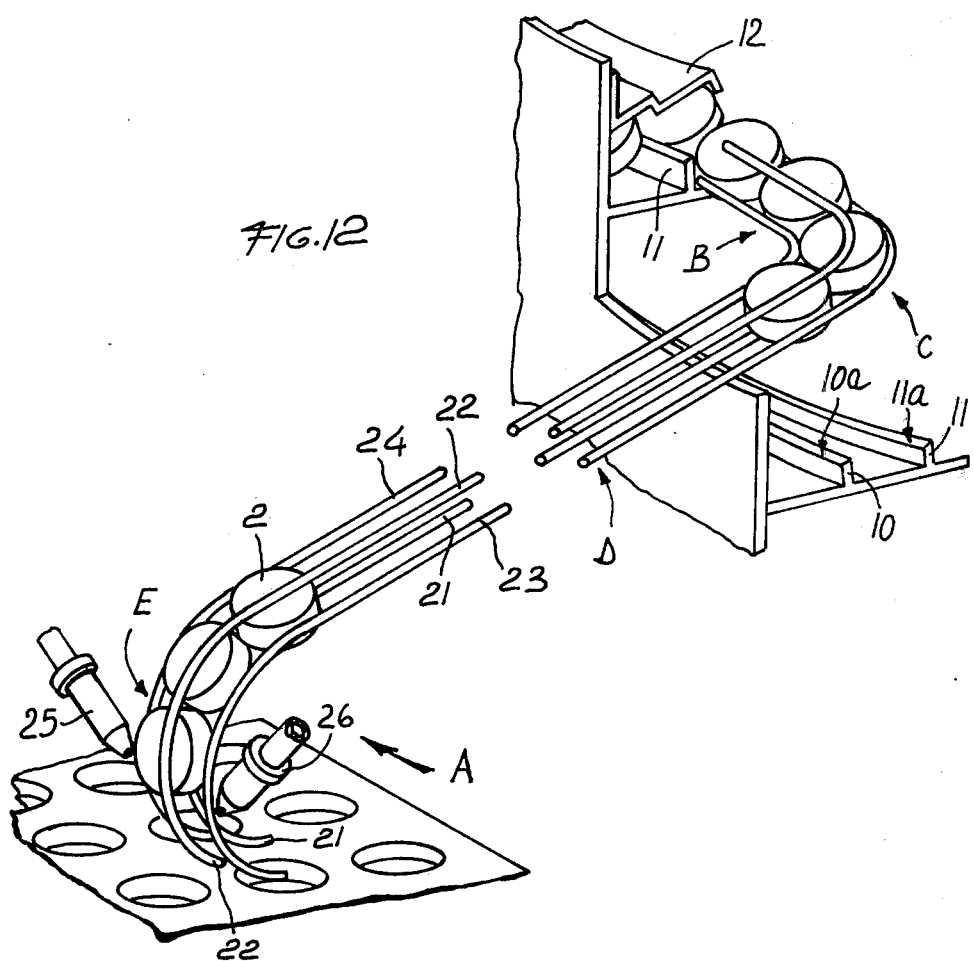

TABLET FEEDER FOR FILLING HONEYCOMB-LIKE CELLS OF A TAPE

BACKGROUND OF THE INVENTION

This invention relates to a tablet feeder for filling honeycomb-like cells arranged in longitudinal rows in a belt moving forward continuously.

For tablet packaging, containers are commonly employed which are known as "blisters" and comprise essentially a rigid support, generally in the form of a belt of a thermoplastic material, wherein there are formed by deformation under heat application a certain number of cells arranged in parallel rows, suitable to accomodate tablets, and whereto a thin covering metal foil web is affixed which can be ruptured at each single cell to remove the related tablet. That type of "blister" is also employed to contain capsules of the type comprising an enclosure which is closed by a cover, in particular to contain antibiotics. To arrange the tablets onto the support, feeders are currently provided which comprise a container having two opposite flattened slots at the bottom for the cell belt to enter and exit therethrough; randomly arranged tablets are loaded into the container such as to be arranged onto the belt and into the cells, at the container outlet the belt being clipped by the edge of the outlet slot such as to arrange the tablets in the cells and remove the excess tablets.

The above described type of feeders are not without shortcomings, notably when employed in the packaging of tablets which tend to crumble, forming fragments, dust or the like; in this case, in fact, it happens that some of the blister cells enclose chips and damaged tablets which prevent the tablets from dropping out correctly; furthermore, dust collected at those areas of the web or belt which are intended to be attached or bonded to the foil-like covering material, thereby the latter does not adhere to the belt or web correctly.

SUMMARY OF THE INVENTION

It is an object of this invention to obviate the cited shortcomings, by providing a tablet feeder capable of ensuring a correct filling of all the cells in the web or belt, and of leaving the belt perfectly clean upon completion of the filling step.

This object is achieved by a tablet feeder for filling cells arranged in longitudinal rows in a belt moving forward continuously, according to the invention, characterized in that it comprises: a tablet container having a vertical axis cylindrical wall and a slightly convex base, at least one bracket member extending along a cylindrical helix around the inner surface of said wall and resting at the bottom on said base; a vibrating means associated with said container and being effective to cause at least one such row of tablets to climb up along said bracket member, at least one tablet guiding tubular duct extending obliquely from the top end of said bracket member downwardly, and having an upper tablet inlet mouth in alignment with said bracket member to receive the tablets and a lower tablet outlet mouth substantially orthogonal with respect to the belt direction of advance, said lower mouth being aligned with the cells of a longitudinal row to be filled, each tablet being urged into a respective empty cell by the tablets following it.

BRIEF DESCRIPTION OF THE DRAWINGS

Further features will be more apparent from the following detailed description of a preferred embodiment of a feeder according to the invention, illustrated by way of example in the accompanying drawings, where:

FIG. 1 is a side view, in section along a centerplane, of the container of the inventive feeder;

FIG. 2 is a top view of the feeder of FIG. 1;

FIG. 3 is an enlarged detail top view of the outlet of a helix bracket member;

FIG. 4 is a perspective, fragmentary, view of a feeder tubular duct and its connection to a related bracket member and to the belt or web surface;

FIG. 5 is a schematic top view of a feeder filling a belt or web having six rows of cells;

FIG. 12 is a perspective view similar to that of FIG. 4 of a second embodiment of the invention.

DESCRIPTION OF THE PREFERRED EMBODIMENTS

Figure 6:
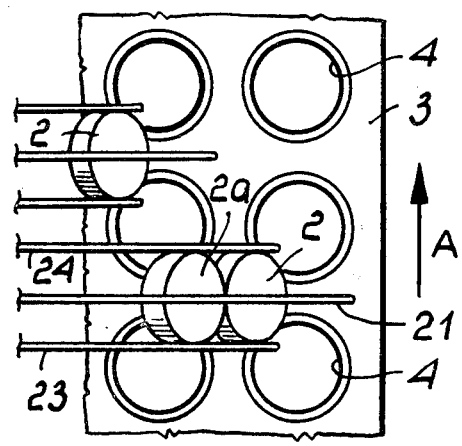
FIGS. 6, 7 and 8 show, as seen from above, the successive steps of filling one row of cells.

Making reference to the drawing figures, the numeral 1 denotes generally the feeder, according to the invention, of tablets 2 onto the belt or web 3 running continuously; the belt or web 3, in the particular instance illustrated by the figures, is of a type having six rows of cells 4a, 4b, 4c, 4d 4e and 4f, in alignment with one another and moving forward in the direction of the arrow A.

The feeder 1 comprises a cylindrical container 5, with vertical axis which has its base 6 slightly convex and carries three inside mounted bracket members 7, 8 and 9 extending along a cylindrical helix parallel to one another; the container 5 is associated to a vibrating means 5a of conventional design which is effective to cause the tablets, randomly loaded into the container, to move toward the container periphery, i.e. the convex base 6, and then advance onto the bracket members.

The bracket members 5 have a length dimension which is at least twice as large as the diameter of the tablets, and have two respective projecting ribs 10 and 11, which at their initial portions connect to the bracket member surface, and which, advantageously, have their upper corners 10a and 11a sloping outwardly; suitably, the width dimension of the bracket members 5 is equal to about three tablet diameters, such as to ensure the presence of at least two rows of tablets on the bracket member.

In their forward movement along the bracket members 5, as caused by the cited vibrating means, the edges facing the axis of the container of the two rows of tablets are progressively lifted by the ribs 10 and 11; suitably, the start of the rib 10 is slightly arcuated toward the container walls and functions as a partition diaphragm separating the two rows of tablets. Above the bracket members, there are attached to the container 5 shaped covers 12 which prevent the tablets from falling off. The covers, bracket members, and ribs define annular tablet advancing seats which are inclined over a horizontal plane. Close to their upper portions, the bracket members are provided with through slots 13, wherethrough faulty tablets, or chips and tablet dust, are allowed to fall back into the container.

At the ends of the bracket members in the container, an aperture 14 is provided whereat are located the inlet mouths of guide ducts 15,16,17,18,19 and 20, each such duct comprising thin battens 21,22,23 and 24 which are arranged above, below and on both sides of the tablets and are adapted to form substantially tubular guides for the tablets.

Figure 9:
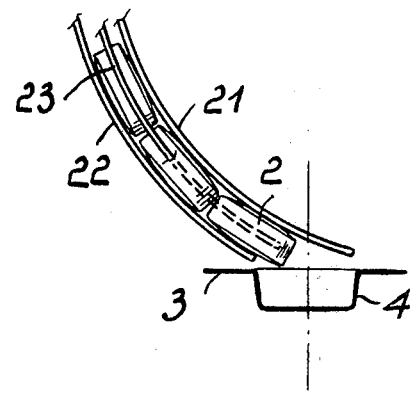
FIGS. 9, 10 and 11 are schematic side views of what appears in the preceding three figures
Figure 7:
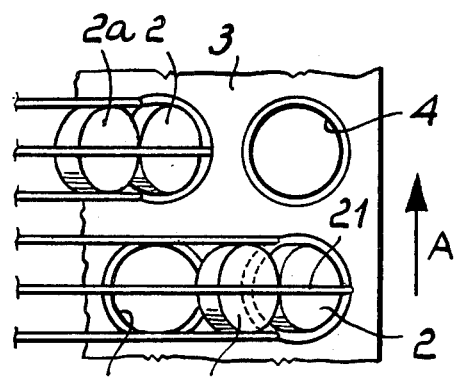
Figure 10:
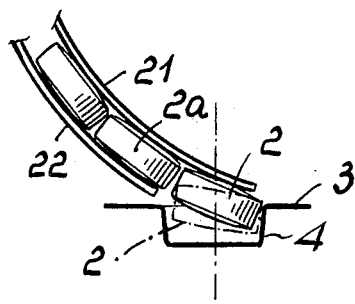
Figure 8:
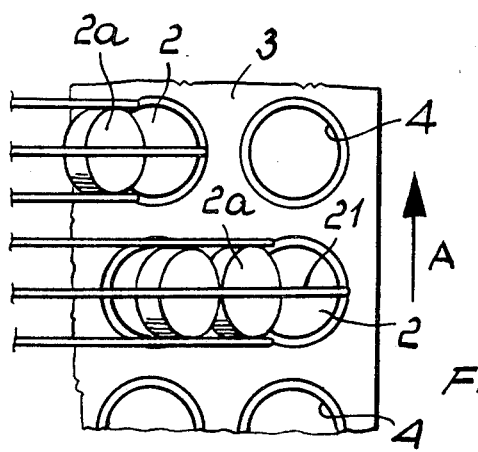
Figure 11:
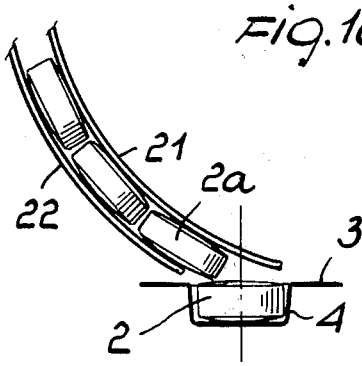

Each such duct has a first portion B aligned with the corresponding row of tablets of the related bracket, and extends accordingly along a curve of comparatively small radius C, to take place radially to the container while retaining its downward inclination, D, with respect to a centerplane of the container; at the bottom, each duct follows a substantially semicircular curve, E, such as to have its outlet mouth aligned with the row of cells to be filled and nearly in contact with the belt or web. It should be noted that the inclination that the tablets take on the brackets 7,8 and 9 owing to the ribs 10 and 11, is retained thereby along the respective ducts 15,16,17,18,19 and 20. FIGS. 6,7,8,9,10 and 11 show clearly how the individual tablets 2 are stopped at those areas of the belt or web which have no cells (FIGS. 6 and 9), how they are caused to slide and then pressed downwards into the empty cells (FIGS. 7 and 10) by the following tablets which are present in the guide, and finally (FIGS. 8 and 11) how a tablet 2 previously inserted into its related cell stops the following tablet 2a present in the guide.

Attention is drawn on the fact that, first of all, the tablet guiding ducts extend, with the exception of the portions B and C, in vertical planes orthogonal to the direction A of belt advance, and secondarily, the tablets retain a constant inclination on a horizontal plane along the end portions of the brackets end portions B,C,D of the ducts.

Most suitably, while advancing along the bracket members, the tablets are caused to roll on themselves or tumble, and any tablets having damaged edges fall through the slots 13, thus not to be inserted in the web or belt.

From the foregoing description, it will be apparent that the invention prevents deposition of faulty tablets in any cells, and any dust, tablet chips and the like from falling onto the web or belt.

The invention as herein described is susceptible to many variations and modifications. Thus, for example, the number of brackets and ribs per bracket member may differ from that illustrated with reference to the number of cells to be filled. Moreover, in order to facilitate the insertion of the tablets into the cells, as shown in the embodiment of FIG. 12 nozzles 25,26 may be provided at the duct lower end communicating to a source of compressed air and so orientated as to accelerate the tablet descent. The use of nozzles is particularly advantageous in feeding capsules, which, being rather light with respect to the tablet, have difficulty to enter the cells by gravity as the belt moves at high speed.

I claim:

1. A tablet feeder for filling cells arranged in longitudinal rows in a belt moving forward continuously, characterized in that it comprises: a tablet container having a vertical axis cylindrical wall and a slightly convex base, at least one bracket member extending along a cylindrical helix around the inner surface of said wall and resting at the bottom on said base; a vibrating means associated with said container and being effective to cause at least one such row of tablets to climb up along said bracket member, at least one tablet guiding tubular duct extending obliquely from the top end of said bracket member downwardly, and having an upper tablet inlet mouth in alignment with said bracket member to receive the tablets and a lower tablet outlet mouth substantially orthogonal with respect to the belt direction of advance, said lower mouth being aligned with the cells of a longitudinal row to be filled, each tablet being urged into a respective empty cell by the tablets following it.

2. A feeder according to claim 1, characterized in that said bracket member has a width dimension at least twice as large as the tablet diameter, and has at the top two ribs, said ribs being arranged one in a substantially central position with respect to the bracket member and the other close to the inner edge of the bracket member, and at the initial portions connecting to the bracket member surface, said ribs being adapted to cause the edges facing the container axis of the two tablet rows to lift such as to arrange the tablets inclined at an angle substantially equal to the angle included between said ducts and the belt or web plane.

3. A feeder according to claim 1, characterized in that, above said bracket member, a shaped cover is attached defining, together with the bracket member and related ribs, two annular seats inclined, with respect to the container axis.

4. A feeder according to claim 1, characterized in that nozzles are provided at the lower ends of the ducts, said nozzles being connected to a source of compressed air and orientated such as to accelerate the tablet descent.

5. A feeder according to claim 1, characterized in that each said tubular duct is formed by four battens located above, below, and on both sides of the tablets.

6. A feeder according to claim 3, characterized in that each said duct has its lower end describing a semicircle with the outlet mouth facing the container.

7. A feeder according to claim 1, characterized in that said bracket members, near the top thereof, are provided with through slots for the faulty tablets to fall therethrough.

* * * * *